United States Patent [19]
Gallant

[11] 3,783,481
[45] Jan. 8, 1974

[54] CURVED ROLL
[75] Inventor: James O. Gallant, Rehoboth, Mass.
[73] Assignee: Mount Hope Machinery Company, Taunton, Mass.
[22] Filed: Nov. 25, 1970
[21] Appl. No.: 92,657

[52] U.S. Cl. .............................. 29/116 AD, 26/63
[51] Int. Cl. .................................... B21b 13/02
[58] Field of Search .................. 29/116 AD, 116 R, 29/130, 132; 26/63

[56] References Cited
UNITED STATES PATENTS
| | | | |
|---|---|---|---|
| 2,735,156 | 2/1956 | Craver | 26/63 |
| 2,771,658 | 11/1956 | Morrill | 29/116 R |
| 2,960,749 | 11/1960 | Robertson et al. | 26/63 |
| 3,012,301 | 12/1961 | Rogers et al. | 29/116 R |
| 3,328,866 | 7/1967 | Robertson | 29/116 AD |

FOREIGN PATENTS OR APPLICATIONS
| | | | |
|---|---|---|---|
| 988,681 | 5/1951 | France | 29/116 R |
| 149,385 | 4/1961 | U.S.S.R. | 26/63 |

Primary Examiner—Alfred R. Guest
Attorney—Rich & Ericson

[57] ABSTRACT

A longitudinally-curved roll has a rotating surface sleeve which extends over the full face length of the roll without support apart from a series of spaced bearings mounted on a curved axle. The sleeve is formed of reinforced resin, and has the configuration of a circular cylindrical tube. It is rotatably mounted by the series of bearings, and is deflected thereby within its elastic limit into the longitudinally-curved form of a toroidal segment. This form remains stable as the sleeve rotates. A surface sleeve of elastomeric material can be fitted snugly over the resin sleeve, and does not require reinforcing cords if it is bonded thereto.

12 Claims, 3 Drawing Figures

PATENTED JAN 8 1974

3,783,481

INVENTOR.
JAMES O. GALLANT
BY Rich & Ericson
ATTORNEYS

CURVED ROLL

BACKGROUND AND BRIEF DESCRIPTION OF THE INVENTION

This invention relates to improvements in curved rolls useful in the treatment of flexible sheet or web materials. Such rolls may have a fixed curvature, such as described and claimed, for example, in U.S. Pat. No. 2,960,749 or U.S. Pat. No. 2,393,191; or the curvature may be adjustable, as in U.S. Pat. No. 2,898,662. Longitudinally-curved rolls are employed in various arts for laterally expanding or contracting such materials as knitted or woven cloth, paper, plastic film, metal foil, webs of tire cord, and the like, to remove wrinkles and to draw the sheet of material to a predetermined width. These rolls are also used for correcting bow or curvature of the weft elements of woven materials, and of the courses of knit goods.

Curved rolls of the type to which this invention relates have a longitudinally-curved axle which is stationarily supported. A series of bearings are spaced along the axle for the purpose of supporting a unitary tubular surface sleeve for rotation about the curved axis of the roll. The surface sleeve must be flexible enough to rotate freely about the curved axle while retaining the form of a toroidal segment. Each segment of the sleeve must cyclically expand and contract lengthwise of the roll once upon each revolution, and the stress imposed by this strain must neither exceed the yield point or fatigue limit of the material nor impose undue loads on the supporting bearings. The sleeve is therefore conventionally made of a resiliently flexible elastomeric material such as rubber. But the roll must also meet the conflicting requirement of supporting the load applied to the sleeve by a sheet partially wrapped about it and held under tension, without allowing the sleeve to be appreciably distorted from the form of a smoothly-curved segment of a toroid. That is to say, the sleeve must have characteristics of flexibility, and yet must be rotationally supported as though it were rigid in form.

Several methods of supporting a flexible sleeve in a stable toroidal configuration have been proposed. One of these, shown by the aforementioned Pat. No. 2,960,749, employs a cylindrical helix of metal which extends coaxially along the axle inside the flexible sleeve, and is rotationally supported directly on the bearings. This solution has not proven satisfactory because the helix permits the sleeve to distort excessively between the points of bearing support, and also tends to crack after a period of use. The conflicting requirements of stiffness and flexibility are evidently not adequately met, and the cyclical application of stress results in early fatigue failure.

Another solution, which is in widespread use and is successful, is shown for example by the aforementioned Pat. No. 2,393,191. A series of tubular cylindrical metal spools are spaced along the curved axle, being supported thereon by a series of bearings for rotation about different rectilinear axes, each axis being tangent to the curved axis of the axle at the particular location of that spool. The sleeve, being received over such a series of spools, is in fact not curved completely smoothly, but follows curves consisting of a series of essentially straight line segments connected by short curved segments over the gaps which are left between adjacent spools. To obtain a satisfactory approximation to a true toroidal form, the spools should be individually short and therefore large in number, requiring a proportionately large number of bearings to mount them.

Curved rolls of the type exemplified by Pat. No. 2,393,191 provide very adequate rigidity of form to the sleeve as against distortion caused by the tension in the treated sheet or web. However, the steel spools do not aid in resisting ballooning of the sleeve, that is, an increase in sleeve diameter induced by centrifugal force at high rotational speeds. It is necessary to reinforce the sleeve internally with circumferential cords to resist this effect. Not only does this increase the cost of the sleeve, but the sleeve must be replaced before the surface wears down to the level of the cords, and therefore must be made relatively thick. If it were possible to bond the rubber sleeve to the full lengths of the spools this shortcoming would be corrected, but this solution is not feasible. The formation of full-length bonds between the sleeve and the spools would require all of the expansion and contraction of the sleeve to take place in the narrow gaps between the spools; this would entail a non-uniform stretching action localized in small areas spaced across the width of the roll. Consequently, the practice is to leave the sleeve free to expand uniformly over its full length without restraint by the spools. Unfortunately, this also has a deleterious effect, in that it causes the sleeve to rub back and forth over the spool surfaces as it cyclically expands and contracts.

It is sometimes required that a curved roll be driven by external motive means in order satisfactorily to handle delicate or stretchy materials that cannot be subjected to heavy tension. It is conventional in these cases to drive the sleeve through a sheave attached to one of its ends; but the driving torque produces a longitudinal twist, since an elastomeric sleeve has very limited torsional rigidity. To avoid this, it would be necessary to machine interconnecting gear teeth in the spools for transmitting the torque from the driven end of the sleeve through its length.

It is a general object of this invention to provide an improved curved roll whose rotatable surface sleeve is supported in a stable manner in the deflected form of a generally toroidal segment, yet which requires a reduced number of bearings relative to a previously-known curved roll.

It is another object to provide an improved curved roll whose rotatable surface sleeve is deflected in a stable manner into a smoothly-curved generally toroidal form.

It is another object to provide an improved curved roll in which a flexible elastomeric surface sleeve can be bonded over its full length to supporting means, with the result that the sleeve does not require reinforcing cord; this reduces the cost of the sleeve and also permits its thickness to be less than was heretofore required.

It is still another object to provide an improved curved roll which can be driven from one end by external motive means without an undesirable degree of torsional deflection of the sleeve being produced thereby. Further objects and advantages of the invention will appear as the following description proceeds.

I have discovered that the foregoing objects can be attained, in a curved roll which includes a longitudinally-curved axle having a series of bearings spaced therealong, by providing a full-length tubular sleeve formed of reinforced resin, such as glass fiber-reinforced epoxy or polyester resin. A flexible elastomeric surface sleeve may be fitted over the resin sleeve, where it is desired to increase the coefficient of friction of the roll surface; and I have found that the elastomeric sleeve may be bonded over its full length to the outer surface of the resin sleeve. The resin sleeve is rotatably mounted directly on the bearings, and the series of short metal spools required by previously-known rolls is omitted. Since the resin sleeve bends smoothly into the form of a toroidal segment, instead of a series of connected cylindrical segments, the required number of bearings is reduced appreciably; yet the sleeve is fully stabilized against distortion between bearings, by the stiffness of the reinforced resin. The resin sleeve also exhibits a uniform degree of expansion and contraction at any point along the roll, and the spreading action on sheet material is accordingly uniform.

When furnished with a bonded elastomeric outer sleeve, the improved roll provides ample resistance to ballooning under centrifugal force, and does not require reinforcing cord in the outer sleeve. The result is that the initial cost of manufacture is reduced. The outer rubber sleeve can also be worn to a thinner dimension before replacement is required, so that a longer useful service life is obtained; or it may be made with less initial thickness, at a correspondingly lower cost. The bonding of the surface sleeve to the resin sleeve also eliminates the rubbing that has hitherto been induced by the longitudinal expansion and contraction of the sleeve.

In applications which require an external drive to relieve delicate or stretchy sheet material of this tension, the improved roll can be driven by means of a sheave at one end, and the resin sleeve adequately transmits the induced torque without undue torsional deflection.

The ability of a reinfored resin sleeve to flex well enough to rotate easily when held in the distorted form of a toroidal segment, and yet satisfy the conflicting requirements of maintaining a stable form and resisting deformation between its points of bearing support, are thought to result from an especially favorable balance of characteristics as to modulus of elasticity, fatigue limit, elastic limit, fatigue resistance, and also the low cost of producing a thin-walled but dynamically-balanced sleeve. Good balance is essential to obtain satisfactory bearing life at the high speeds of rotation of rolls of this nature.

The maximum strain, or elongation per unit length, which is imposed on a sleeve distorted into the general form of a toroidal segment and forced to revolve about a curved axle, is fixed by limitations as to the radius of curvature and diameter of a given roll. The stress applied to the sleeve material by distorting it in this manner is a function of its diameter, radius of curvature, and modulus of elasticity. Since the diameter and radius of curvature are limiting parameters in any given roll, a successful sleeve must combine a sufficiently high elastic limit with a small enough modulus of elasticity so that the imposed strain does not induce destructive stresses in the material. Further, the sleeve must bend easily enough that the bearings are not overloaded; this also calls for a small modulus of elasticity, and dictates a minimum wall thickness for increased flexibility. But a conflicting requirement must also be met; the sleeve must have stability of form, and must resist excessive distortion in the unsupported regions between the axially-spaced bearings. This seems to require a combination of substantial wall thickness and high modulus of elasticity.

While precise details of any design limits or other criteria are not yet known to me, I have discovered that a reinforced resin sleeve can meet these conflicting requirements very satisfactorily. It also exhibits exceptional fatigue resistance under repeated flexure. Also, a sleeve of this material can be made and well balanced by inexpensive methods, even though the walls are relatively thin.

I have referred herein to the form of the deflected sleeve as a toroidal segment. This term is intended to refer not only to the specific case in which the axle is bent to follow a circular arc, about which the sleeve forms a true toroidal segment, but also the general case in which the axle is bent to follow some other curve, for example a parabola. In the general case, I employ the term toroidal segment as a convenient description of a geometric form generated by a circle centered on and normal to the roll's axis, when the circle is moved along this axis.

DETAILED DESCRIPTION OF THE DRAWINGS

While the specification concludes with claims particularly pointing out the subject matter which I regard as my invention, it is believed that a clearer understanding may be gained from the following detailed description of preferred embodiments thereof, referring to the accompanying drawing, in which:

Figure 1:
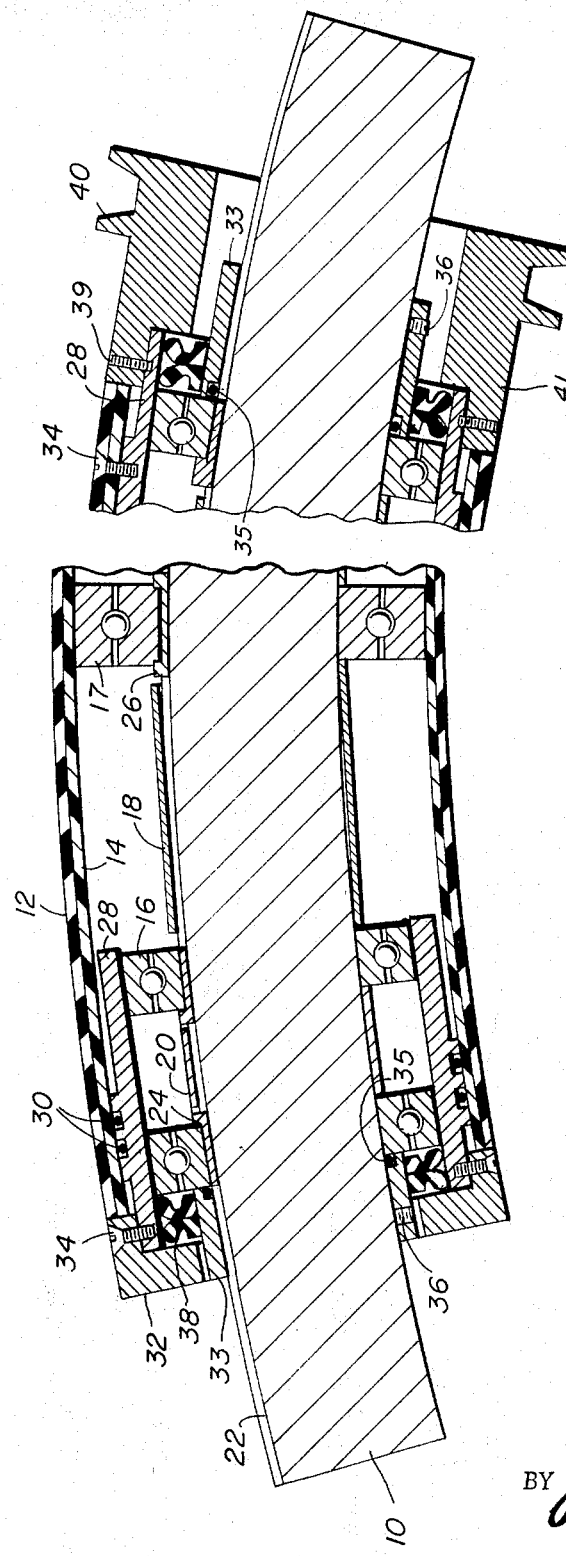
FIG. 1 is a fragmentary cross-sectional view of an illustrative embodiment of the improved curved roll.

The improved roll includes a longitudinally-curved axle 10, whose axis is curved in the plane of the paper in FIG. 1. The axle mounts a series of axially-spaced bearings 16 and 17. A keyway 22 extends along the convex face of the axle to receive keys 24 and 26, which engage the bearings to prevent their inner races from rotating or rattling. The bearings are spaced apart in fixed positions along the axle by means of a series of tubular spacers 18 and 20 interposed between adjacent bearings. The stacked bearings and spacers are held in place by collars 33 having set screws 36 engaging the axle. O-ring seals 35 are received in annular grooves formed in the inner ends of the collars 33 to prevent the ingress of dust or other foreign matter into the bearings in the interior of the roll assembly. Since each bearing is mounted on a different rotational axis, each of which is tangent to the axis of curvature of the axle, 10 at the particular location of that bearing, the spacers 18 and 20 contact each end surface of each bearing only at a single point about its circumference; this point is situated at the concave side of the axle and lies in the plane of the paper in FIG. 1.

A tubular sleeve 14 is formed of reinforced resin, such as glass fiber-reinforced epoxy or polyester resin. This sleeve extends the full working or face length of the roll, and is initially formed as a right-circular cylinder, but is deflected by the bearings 16 and 17 into the form of a toroidal segment, as illustrated in the drawing. The sleeve may be made either by molding, casting or centrifugal casting, and may be turned or ground to the final dimensions if the forming process so dictates.

The reinforcing material may take the form of fiber matting, rovings chopped fibers, or individual filaments. The thickness of the sleeve 14 and the radius of curvature of the axle 10 should be selected, with due reference to the designed diameter of a particular roll, and the characteristic modulus of elasticity of the selected reinforced resin, such that the strain imposed on the sleeve as it rotates in the distorted form of a toroidal segment will not cause the stress induced in the sleeve either to exceed the fatigue point of the reinforced resin, or to overload the bearings. The thickness must, on the other hand, be sufficient to prevent excessive distortion of the sleeve from its smoothly-curved configuration in the regions of the axial gaps between the bearings 16 and 17. I have manufactured and tested a satisfactory roll having the following physical characteristics and dimensions:

Sleeve (or face) length (10) : (10)² 70 inches
Deflection at center
  measured from a chord (10) : (10)² ⅜ inch, or 0.54% of face length
Sleeve diameter (10) : (10)² 6 ¼ inches
Sleeve wall thickness (10) : (10)² ⅛ inch The sleeve was centrifugally cast from chopped glass fiber and epoxy resin, with an initial wall thickness of one-quarter inch and an outside diameter of 6 ½ inches. After curing, it was ground to the finished diameter and wall thickness. Two pairs of bearings 16 were provided at the ends of the sleeve, and three bearings 17 were spaced along the sleeve at 14 inch intervals from one another and from the inner one of each pair 16. This spacing is substantially greater than would be acceptable in a conventional roll of the same dimensions, since the cylindrical spools would have to be considerably shorter. The roll has been successfully run at speeds as high as 5,000 rpm.

In the construction shown, an external tubular sleeve 12, formed of a flexible elastomeric material such as rubber, is fitted snugly over the resin sleeve 14 to provide an increased coefficient of surface friction. This surface sleeve may be omitted in applications in which the friction between the sleeve and the treated sheet material need not be very great, or in which only a moderate amount of sheet spreading or expansion is required. For example, a roll without a surface sleeve 12 may be used for preventing wrinkling of a dry or partially dry sheet, particularly if the sheet material is not easily stretched and has abrasive qualities. Such applications appear in the calender section of a paper machine, and in paper winders.

The elastomeric sleeve 12 is preferably bonded to the sleeve 14 over its full length, as by cement. This enables the resin sleeve to resist ballooning or radial expansion of the elastomeric sleeve, without the addition of reinforcing cords to this sleeve. Not only does this reduce the initial cost of the elastomeric sleeve, but it permits this sleeve to be made thinner, or if it has a conventional thickness, to be worn down to a thinner dimension before replacement is required. Full-length bonding also eliminates rubbing between the surface sleeve and its supporting means.

The sleeve 14 is received directly on the outer races of the bearings 17 at points along the length of the roll, and on short tubular spools 28 at each extremity. Each of these spools is mounted on a pair of bearings 16, and provides a mounting for a pair of O-ring seals 30, which seal the ends of the sleeve against water and foreign matter. A plain end cap 32 is secured at one end of the roll assembly by means of screws 34 threaded into the corresponding spool 28. In the form shown, the roll is intended to be driven by external motive means; for this purpose, the opposite end of the roll is provided with an end cap 41 formed with a sheave 40 adapted for receiving a driving belt. This cap is secured to the corresponding spool 28 by screws 39. This construction is provided only for applications in which it is desired to drive the roll, rather than requiring the treated sheet to turn it by means of the application of longitudinal tension to the sheet. In those applications where it is acceptable to drive the roll simply by pulling the sheet, plain end caps 32 would be employed at each end of the roll.

Inasmuch as circumferential gaps appear between the end caps 32, 41 and the collars 33, annular rubber seals 38 surround these collars and rub against the inner surfaces of the spools 28 to seal the assembly against the entry of moisture or dust at these gaps.

Figure 3:
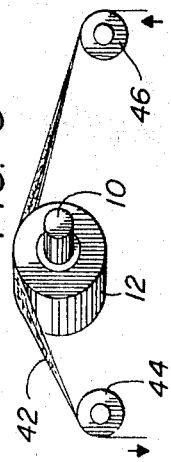
FIG. 3 is a view in end elevation, exemplifying the mode of using the improved roll to treat sheet or web materials.
Figure 2:
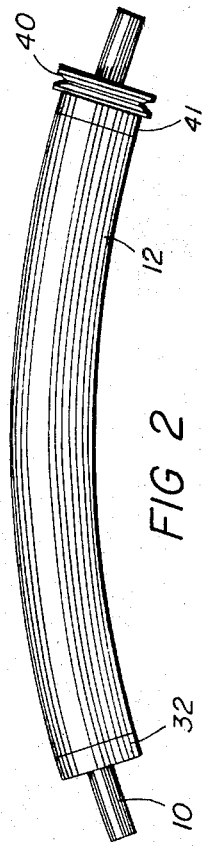
FIG. 2 is an external plan view of the roll of FIG. 1.

The improved roll is shown in a typical application in FIG. 3, in which a sheet of material 42 is partially wrapped about the sleeve 12, its path being determined by a pair of idler rolls 44 and 46. Assuming that the sheet 42 is fed in the direction shown by the arrows, the axle 10 is stationarily mounted in such a position that the plane of curvature of the axle is substantially perpendicular to a plane bisecting the angle of wrap of the sheet around the roll. The sheet approaches the concave face of the roll and departs from the convex face, which causes it to be expanded laterally. A reversal of the feeding direction would contract the material. For application to the correction of bow distortions of the weft or filler threads of woven materials, the plane of curvature of the axle would be turned from the illustrated position more or less toward coincidence with a plane bisecting the wrap angle, thereby differentiating the longitudinal path lengths of various warp elements, situated at different locations across the width of the sheet, in a manner to correct this type of distortion.

It will be observed from the foregoing description that the improved curved roll affords a smooth toroidally-curved surface which is stabilized against distortion, and yet requires a reduced number of bearings to sustain this form; which provides a more uniform expanding and contracting effect; which enables an elastomeric surface sleeve to perform satisfactorily even though it has no internal reinforcing cords and may have a thinner dimension than heretofore; that eliminates rubbing between the surface sleeve and its supporting means; and which may be externally driven from one end without appreciable torsional distortion.

I claim:

1. A curved roll comprising:
    a longitudinally-curved elongated stationary axle;
    a series of bearings mounted in axially-spaced relation along said axle;
    a sleeve formed of cured reinforced synthetic resin having a modulus of elasticity of substantially at least the order of cured reinforced polyester resin, in the configuration of a circular cylindrical tube; said sleeve being received about said bearings for rotation about said curved axle, said sleeve being deflected within its fatigue limit by said bearings into a longitudinally-curved form which remains stable as said sleeve is rotated and continuously flexed.

2. A curved roll as recited in claim 1, said axle having its major longitudinal axis curved in a single plane, said sleeve being deflected into a form generated by a circle perpendicular to and centered on said curved axis when said circle is moved along said axis.

3. A curved roll as recited in claim 1, said axle having its major longitudinal axis curved in a single plane, said sleeve being deflected into the form of a substantially toroidal segment.

4. A curved roll as recited in claim 1, said sleeve comprising a substantially continuous tubular wall extending over substantially the full working face length of said roll.

5. A curved roll as recited in claim 1, including at least three of said bearings.

6. A curved roll as recited in claim 1, said sleeve being formed of fiber-reinforced epoxy resin.

7. A curved roll as recited in claim 1, said sleeve being formed of fiber-reinforced polyester resin.

8. A curved roll as recited in claim 1; the curvature of said axle, the outside diameter of said sleeve, the thickness of the walls of said sleeve, and the modulus of elasticity of said sleeve, all being selected to maintain the stress imposed on said sleeve by the deflection thereof at a value less than the fatigue limit thereof while sustaining said sleeve in a substantially stable longitudinally-curved form.

9. A curved roll as recited in claim 1, said axle having its major longitudinal axis curved in a single plane, said bearings being mounted on said axle for rotation about different axes each tangent to the curve of said axis at the axial location of the corresponding bearing.

10. A curved roll as recited in claim 1, together with a surface sleeve of flexible elastomeric material formed in the configuration of a circular cylindrical tube, said surface sleeve being fitted snugly about said resin sleeve and extending substantially over the full working length thereof.

11. A curved roll as recited in claim 10, said surface sleeve being substantially its entire interior surface bonded to the exterior surface of said resin sleeve.

12. A curved roll comprising:
a longitudinally-curved elongated stationary axle;
a series of bearings mounted in axially-spaced relation along said curved axle;
a composite sleeve comprising inner and outer sleeve elements bonded together and forming a circular cylindrical tube, said inner sleeve element being formed of cured reinforced synthetic resin, having a modulus of elasticity of substantially at least the order of cured reinforced polyester resin, and said outer sleeve element being formed of flexible elastomeric material;
said composite sleeve being received about said bearings for rotation about said curved axle, said composite sleeve being deflected within the fatigue limit of said inner sleeve element by said bearings into a longitudinally-curved form which remains stable as said sleeve is rotated and continuously flexed.

* * * * *